Dec. 21, 1943.  W. J. JOYCE  2,337,111
CLUTCH PLATE
Filed May 29, 1942  2 Sheets-Sheet 1

Inventor
William J. Joyce
By Blackmore, Spencer & Flint
Attorneys

Dec. 21, 1943.　　W. J. JOYCE　　2,337,111
CLUTCH PLATE
Filed May 29, 1942　　2 Sheets-Sheet 2

Inventor
William J. Joyce
By Blackmore, Jancer & Hurt
Attorneys

Patented Dec. 21, 1943

2,337,111

UNITED STATES PATENT OFFICE 2,337,111

CLUTCH PLATE

William J. Joyce, Southbridge, Mass., assignor to General Motors Corporation, Detroit, Mich., a corporation of Delaware Application May 29, 1942, Serial No. 445,025

12 Claims. (Cl. 192—107)

This invention relates to friction clutches such as are used on motor vehicles to couple the engine shaft with the transmission shaft. Although intended primarily to be used in that relation it will be understood that friction clutches in accordance with this invention may be found useful elsewhere.

An object of the invention is to provide means to cushion the engagement of the frictional members of the clutch.

A further object is to accomplish the major object by making use of the unequal expansion due to heat of two unlike metallic members.

As a further object the invention provides simple, effective and relatively inexpensive arrangements to accomplish the major object.

The accompanying drawings show several embodiments of the invention.

Figure 1:
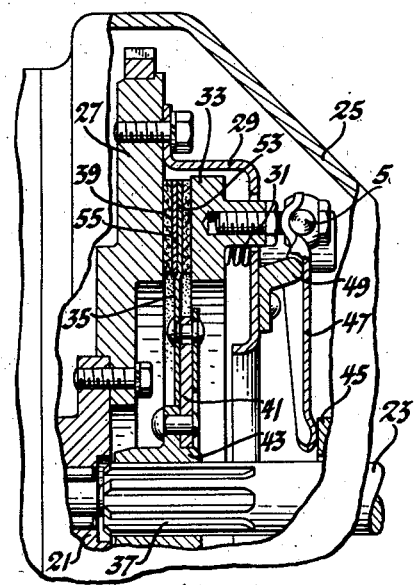
Fig. 1 is a transverse section of a friction clutch in which the invention may be incorporated.
Figure 2:
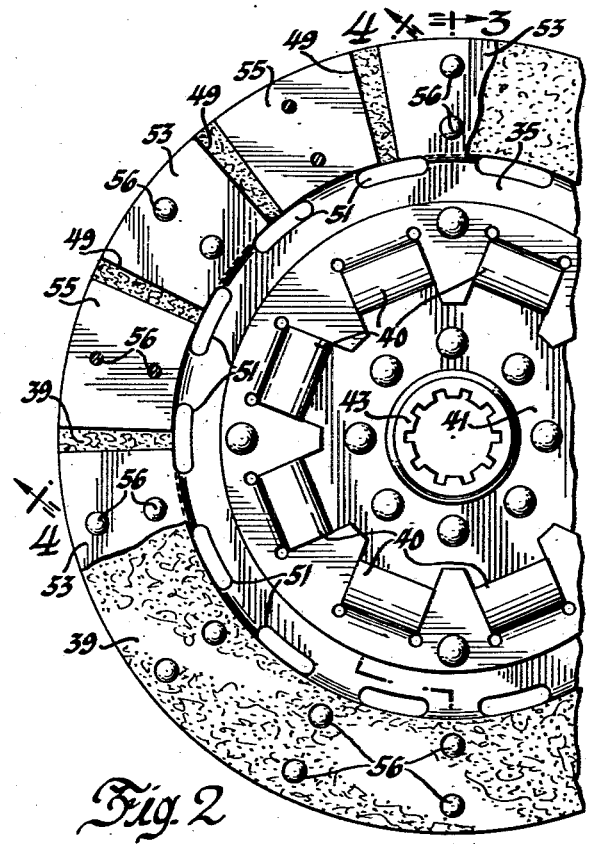
Fig. 2 is a view in elevation of the clutch shown by Fig. 1.
Figure 3:
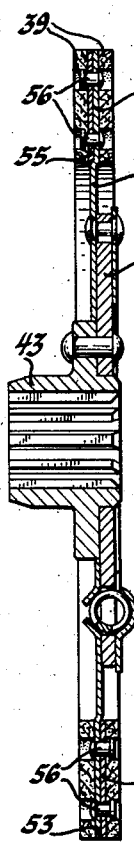
Fig. 3 is a sectional view, the plane being indicated by line 3—3 of Fig. 2.
Figure 4:
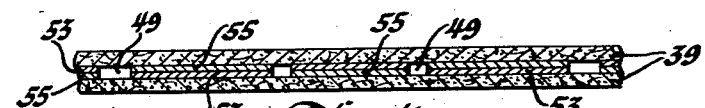
Fig. 4 is a view in section indicated by line 4—4 of Fig. 2.

An inspection of Fig. 1 will show a friction clutch of more or less conventional form. As illustrated it is used to connect an engine shaft 21 to a transmission shaft 23. The clutch is enclosed in a housing 25. The engine shaft carries a flywheel 27 having a cover 29 which also serves as an abutment for a spring or springs 31 operable to push forward a pressure plate 33 which grips between itself and the flywheel a driven plate 35, the latter slidably splined at 37 on the transmission shaft and having facings 39. In connection with its sliding support the driven plate may be connected by cushioning means, not shown, but housed within formations 40, to a flange 41 on or secured to the sliding hub 43. The clutch is to be released by some such means as a slidable collar 45 to rotate fingers 47 fulcrumed at 49 on the cover and operable through connections 50 to draw the pressure plate away from the flywheel and against the action of the clutch engaging springs 31.

In such clutches as described above it has been proposed to resort to expedients to resist the movement of the parts frictionally engaging under the influence of the spring. One of the expedients commonly used is the bending of tongues or fingers from the driven plate in the region between the facings. Another expedient is a modification of the facing itself.

Figure 5:
Fig. 5 is a similar section with parts displaced.
Figure 6:
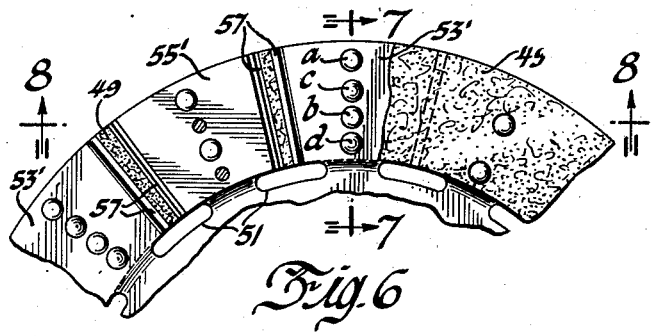
Fig. 6 is a view in elevation of a second form of clutch driven plate.
Figure 7:
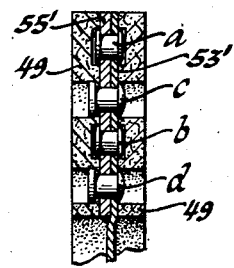
Fig. 7 is a section as indicated by line 7—7 of Fig. 6.

Differing from the earlier expedients the several forms of this invention rely on the use of bimetallic members constituting parts of the driven plate and to which the facings are attached. In Figs. 2 to 5 it will be seen that the driven plate has radial slots 49 extending inwardly from the periphery, which slots terminate near the middle of circumferentially extending slots 51. As a result the margin of the driven plate, the part between the facings, takes the form of a circular series of segments 53. These segments are integral parts of the driven plate and are as usual of steel. Plates of aluminum 55 conforming to the shape of the steel segments are secured one to each steel segment but are located on opposite sides of adjacent segments. The aluminum and steel segments may be bonded together. The lining rivets 56 extend through the mid-portion of both the metal plates but are attached to the lining adjacent the aluminum plates. When the temperature is normal the plates lie flat and are parallel to the facings as in Fig. 4. When heated by heat transfer from the facings the aluminum elongates circumferentially more than the steel so that Fig. 5 illustrates the position assumed. The radial edges of the bent plates push the facings to the positions shown with the result that resistance to flattening is offered as the clutch engaging springs force the parts to the position shown by Fig. 4. It will be apparent that the greater the heat the greater will be the bowed condition and the greater will be the axial cushioning. Also it may be desired to provide an initial cushioning. If so it is only necessary to form the steel and aluminum with an initial bend which will of course increase under the influence of the greater heat coming from the frictionally engaging facings.

Figure 8:
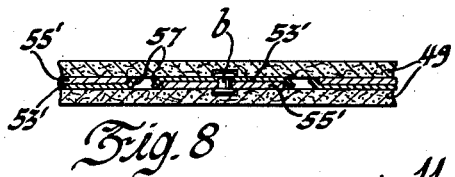
Fig. 8 is a section on line 8—8 of Fig. 6.
Figure 9:
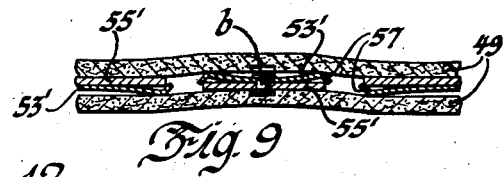
Fig. 9 is a similar section showing the parts displaced from the positions shown in Fig. 8.
Figure 10:
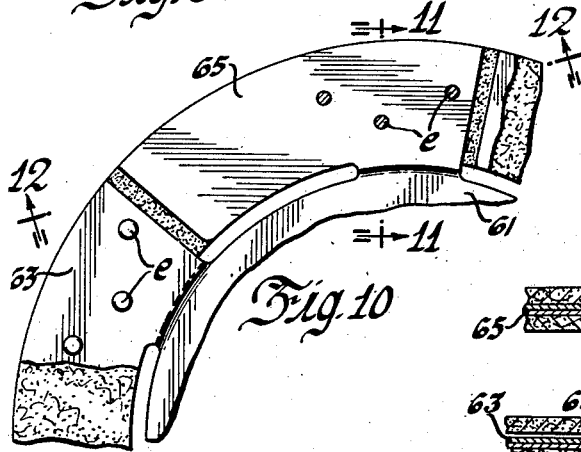
Fig. 10 is a view in elevation of a third embodiment which the invention may assume.
Figure 11:
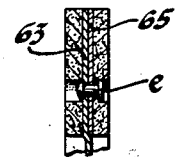
Fig. 11 is a section on line 11—11 of Fig. 10.
Figure 12:
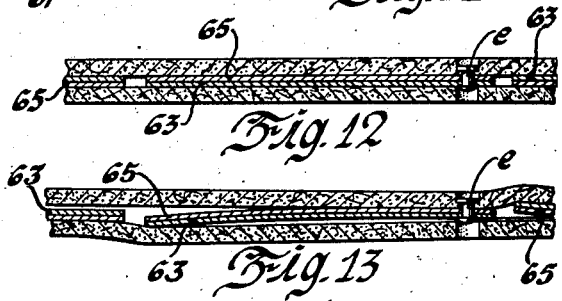
Fig. 12 is a section on line 12—12 of Fig. 10.

Figs. 6 to 9 inclusive show a second form. In this form the driven plate is of steel and of the same general shape as before. In this form the steel and aluminum segments 53' and 55' are not bonded together. The radially extending marginal edges of the steel plates are bent angularly as at 57 to overlie the aluminum plates as shown in Figs. 8 and 9. The plates are held together by a radial row of rivets midway between the ends of the segments. Certain of the rivets *a* and *b* merely fasten the plates together. Others *c* and *d* not only secure the plates together but secure to the plates that facing which is on the side adjacent the aluminum plate. In operation the greater elongation of the aluminum segments results in their ends pushing against the bent ends 57 of the steel plates with the result that the steel plates are displaced from the position shown by Fig. 8 to that of Fig. 9 and the facings are correspondingly displaced. Since the aluminum plates are on opposite sides of adjacent segments the displaced positions are as shown by Fig. 9 and the facing displacement is made possible by its attachment to the aluminum side of the combined plate only.

Figure 13:
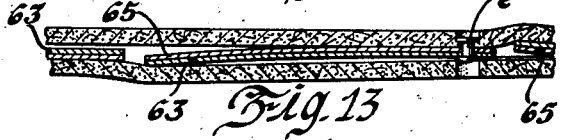
Fig. 13 is a similar section with parts displaced from the positions shown in Fig. 12.
Figure 14:
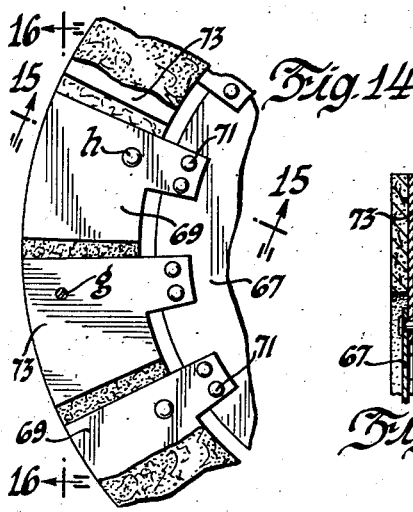
Fig. 14 shows in elevation another form.
Figure 15:
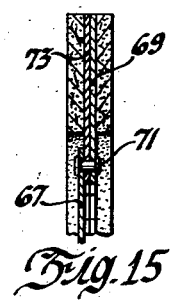
Fig. 15 is a radial section on line 15—15 of Fig. 14.
Figure 16:
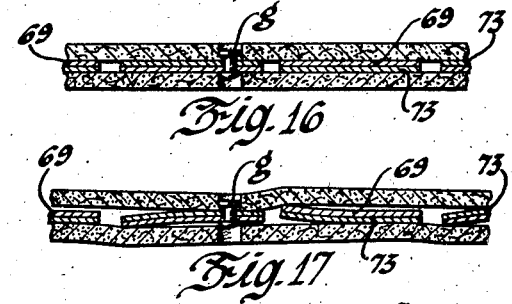
Fig. 16 is a section on line 16—16 of Fig. 14 showing the parts in what may be called their normal position.

In Figs. 10 to 13 inclusive the steel driven plate is marked 61. It has a circular series of circumferentially extending segments 63 each integral with plate 61 at one end. Similarly shaped aluminum plates 65 are attached to the steel plate, being preferably bonded thereto. In changing from the low temperature position of Fig. 12 to the heated position of Fig. 13 it will be seen that the greater expansion of the aluminum causes the assembly to bend as shown. Alternate bending is, of course, produced by bonding the aluminum to opposite faces of adjacent steel segments. Since the extreme free ends of the segments are subject to the greatest extent of bending and since this extreme end of each segment is closely adjacent the root portion of the next segment the rivets *e* adjacent the root secure that facing only which is adjacent the aluminum to the composite segments as shown by Fig. 13 so that the opposite facings may be displaced by the extreme and free end of the adjacent segment.

Figure 17:
Fig. 17 is a section like Fig. 16 but showing an abnormal position of certain essential parts of the driven plate.

Figs. 14 to 17 show another form. Here the driven plate 67 may, if desired, be relatively heavy and segments 69 of spring steel may be attached as by rivets 71. In this way the spinning weight upon clutch release may be reduced owing to reduced weight of the plate at the greater radial distance. Here again aluminum plates 73 are carried by segments 69 being bonded to opposite sides of the adjacent steel segments. Rivets *g* and *h* secure the facings to the segments. These rivets are positioned radially outward from the attaching rivets 71 and secure the facings to the segments at the regions where the facings contact the aluminum segments, rather than the steel, with the result that the facings may be displaced as shown by Fig. 17.

The above descriptive matter presupposes an intent to obtain a cushion which has increasing effect as temperature increases. Should it be desired to obtain a decreasing effect with temperature increase an initial form may be given the assembly wherein the steel and aluminum segments are bowed toward the aluminum side.

The two metals referred to in each case have been steel and aluminum. This has been for the reason that these are now believed to best accomplish the desired object. It will be understood of course that the invention is not restricted to these specific metals but, in its broader aspects, it includes any two metals which may have the function set forth. It will be apparent that the metal segments may be spot welded or riveted or in some way permanently fastened together so that the stresses set up by expansion cause the bending, the edges moving away from the side having the greater expansion rate and toward the side having the lower rate. The extent of bending depends upon temperature, the difference in the coefficients of expansion and the dimensions of the segments.

I claim:

1. In a clutch driving means including parts having relative movements axially, a driven member adapted to be gripped between said parts, said driven member having bimetallic regions which become bent under the influence of heat and afford axial cushioning and friction facings carried by said regions collectively.

2. In a clutch, driving means including parts having relative movements axially, a driven member adapted to be gripped between said parts, said driven member having friction facings on its opposite sides to engage said parts, the portion of the driven member between said facings being in the form of a plurality of segments, each segment being formed of two parallel metallic plates having unequal coefficients of expansion.

3. The invention defined by claim 2, the axial disposition of the metallic plates being opposite in adjacent segments.

4. In a clutch, a driven plate adapted to be gripped between driving members, the marginal portion of said plate formed as a circular series of circumferentially extending segments, plates having a coefficient of expansion differing from that of said segments and secured to opposite faces only of adjacent segments to form composite segments.

5. In a clutch, a driven plate adapted to be gripped between driving members, the marginal portion of said plate formed as a circular series of circumferentially extending segments, plates having a coefficient of expansion differing from that of said segments and secured to opposite faces of adjacent segments to form composite segments, together with facings secured to opposite sides of said composite segments.

6. In a clutch, a driven plate adapted to be gripped between driving members, the marginal portion of said plate formed as a circular series of circumferentially extending segments, plates having a coefficient of expansion differing from that of said segments and secured to opposite faces of adjacent segments to form composite segments, together with facings secured to the opposite sides of said composite segments, each facing being attached to those segments only having the metal of greater coefficient of expansion adjacent thereto.

7. In a clutch, a driven plate adapted to be gripped between driving members, the marginal portion of said plate formed as a circular series of circumferentially extending segments, plates having a coefficient of expansion differing from that of said segments and secured to opposite faces of adjacent segments to form composite segments, together with facings secured to the opposite sides of said composite segments, each facing being attached to those segments only having the metal of greater coefficient of expansion adjacent thereto, the means for attachment comprising rivets midway between the ends of the segments.

8. In a clutch, a driven plate adapted to be gripped between driving members, the marginal portion of said plate formed as a circular series of circumferentially extending segments, plates having a coefficient of expansion differing from that of said segments and bonded to opposite faces of adjacent segments to form composite segments and friction facings carried by said composite segments.

9. In a clutch, a driven plate adapted to be gripped between driving members, the marginal portion of said plate formed as a circular series of circumferentially extending segments, plates having a coefficient of expansion differing from that of said segments and riveted along radial mid-length lines to opposite faces of said adjacent segments, the segments of lesser coefficient of expansion having marginal edges bent over the edges of the other segments.

10. In a clutch, a driven plate adapted to be gripped between driving members, the marginal portion of said plate formed as a circular series of circumferentially extending segments, each segment having a root connection with said plate at one of its ends, other plates shaped to conform to the shape of said segments and bonded thereto on opposite faces of adjacent segments, said other plates having a coefficient of expansion unlike that of said segments and annular friction facings carried by said composite segments.

11. In a clutch, a driven plate adapted to be gripped between driving members, the marginal portion of said plate formed as a circular series of circumferentially extending segments, each segment having a root connection with said plate at one of its ends, other plates shaped to conform to the shape of said segments and bonded thereto on opposite faces of alternate segments, said other plates having a coefficient of expansion unlike that of said segments, together with friction facings on the sides of said composite segments and rivet means attaching said facings to said segments, the region of attachment being at the roots of said segments and securing a facing to a composite segment only in the region where the facing contacts the plate of greater expansibility.

12. In a clutch, a driven plate adapted to be gripped between relatively reciprocable driving members, said driven plate having on its peripheral margin a circular series of circumferentially extending relatively resilient segments, rivet means to attach the root portions of said segments to said plate, a plurality of similarly shaped segments having a coefficient of expansion unlike that of said first named segments, said second named segments being bonded to opposite sides of adjacent ones of the first named segments.

WILLIAM J. JOYCE.